July 17, 1962   H. E. OSSWALD ETAL   3,044,438
MEANS AND METHODS FOR METALIZING FILMS AND SHEET MATERIALS
Filed Nov. 6, 1959   3 Sheets-Sheet 1

INVENTORS
HANNES E. OSSWALD
BY OTTO A. B. OSSWALD

Alfred W. Petchaft
ATTY

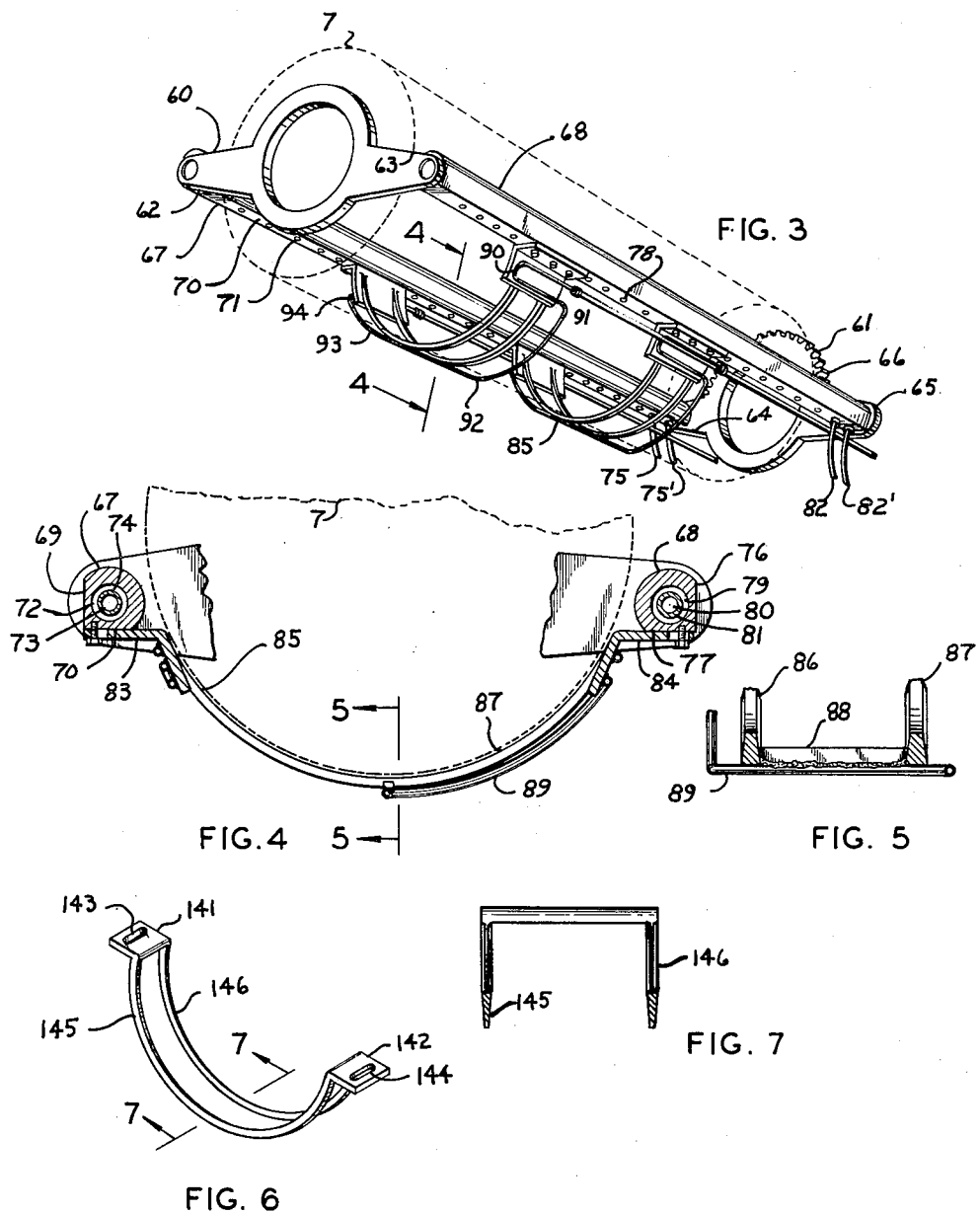

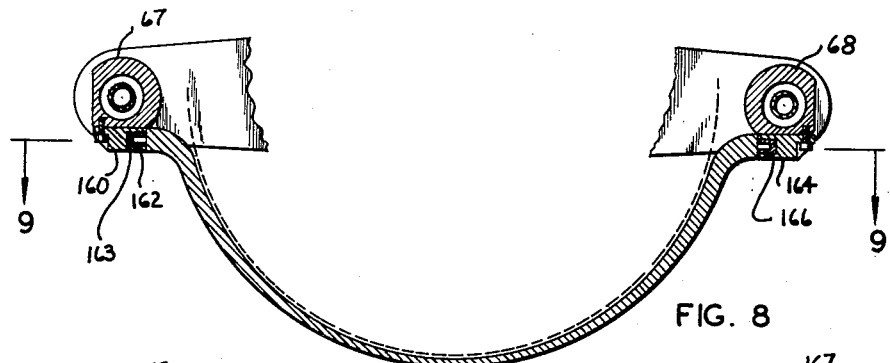
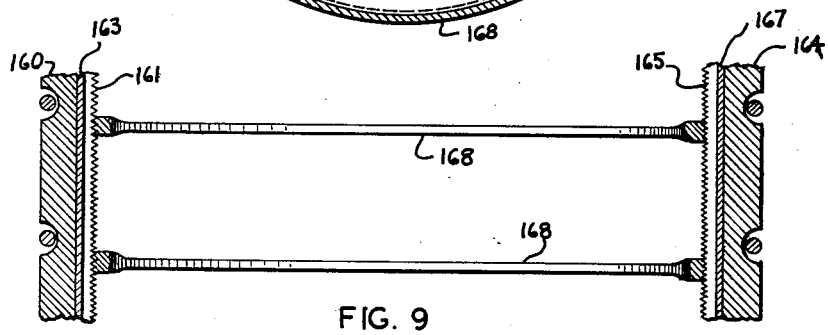
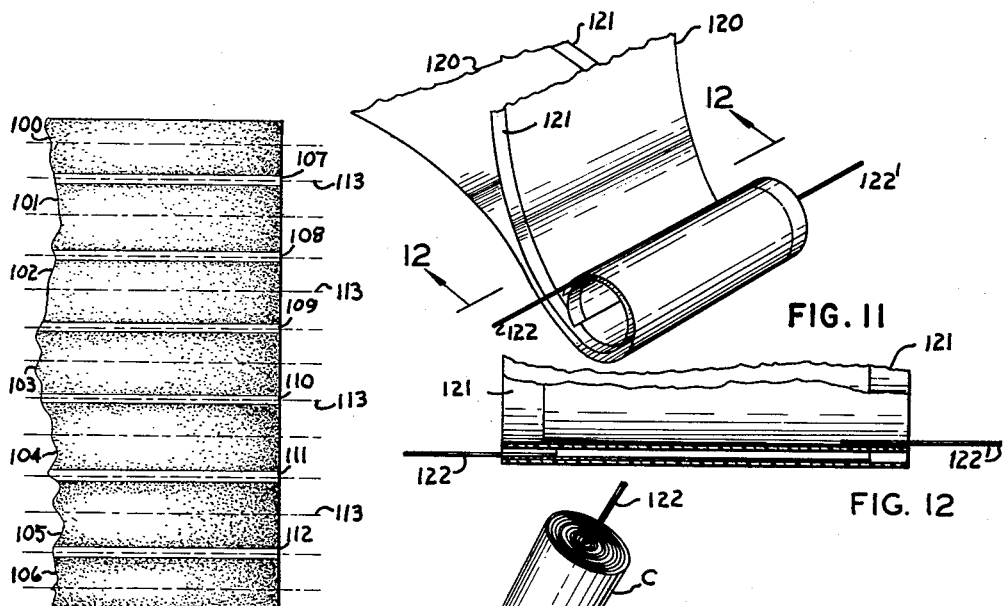
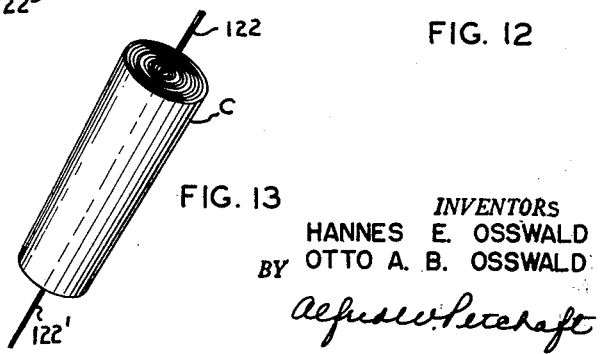
INVENTORS
HANNES E. OSSWALD
BY OTTO A. B. OSSWALD
ATTY.

United States Patent Office 3,044,438
Patented July 17, 1962

3,044,438
MEANS AND METHODS FOR METALIZING FILMS AND SHEET MATERIALS
Hannes E. Osswald and Otto A. B. Osswald, Highland, Ill., assignors to Highland Supply Corp., Highland, Ill., a corporation of Illinois
Filed Nov. 6, 1959, Ser. No. 851,299
9 Claims. (Cl. 118—49.1)

This invention relates in general to certain new and useful improvements in means and methods for metalizing films and sheet materials and, in particular, to means and methods for controlling the deposit of metal on films and sheet materials.

It is the primary object of the present invention to provide highly efficient and economical means and methods for applying a coating of metal to particular parts of films and sheet materials.

It is another object of the present invention to provide means and methods of the type stated whereby a single piece of film may be coated with a thin metallic film in a plurality of spaced parallel areas, and the width of such areas can be accurately controlled and precisely maintained within pre-selected limits.

It is a further object of the present invention to provide means and methods of the type stated which are capable of continuous operation for extended periods of time, thereby achieving exceptionally high production rates.

It is another object of the present invention to provide an apparatus of the type stated capable of applying a metal film in spaced areas upon the surface of a web of base material of substantial length.

It is another object of the present invention to provide apparatus of the type stated which is rugged, durable, and capable of being operated over extended periods of time with minimal maintenance costs.

With the above and other objects in view, our invention resides in the novel features of form, construction, arrangement, and combination of parts presently described and pointed out in the claims.

In the accompanying drawings (three sheets)—

FIG. 3 is a perspective view of the mask assembly forming a part of the present invention;

FIG. 4 is a fragmentary sectional view taken along line 4—4 of FIG. 3;

FIG. 5 is a fragmentary sectional view taken along line 5—5 of FIG. 4;

FIG. 6 is a perspective view of a modified mask-bar for use with the present invention;

FIG. 7 is a sectional view taken along line 7—7 of FIG. 6;

FIG. 8 is a fragmentary sectional view taken along line 4—4 of FIG. 3 for a third modified mash-bar embodying the present invention;

FIG. 9 is a fragmentary sectional view taken along line 9—9 of FIG. 8;

FIG. 10 is a fragmentary top plan view of a piece of film which has been metalized by the present invention;

FIG. 11 is a fragmentary perspective view of the way the individual strips of film would be used to wind a capacitor;

FIG. 12 is a fragmentary sectional view taken along line 12—12 of FIG. 11; and

FIG. 13 is a perspective view of a finished capacitor fabricated per FIG. 11.

Figure 1:
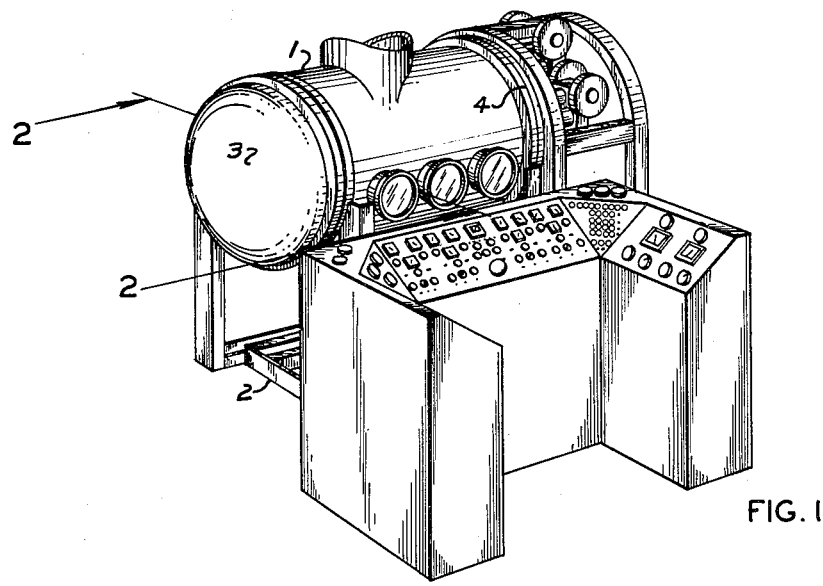
FIG. 1 is a perspective view of a vacuum coating machine constructed in accordance with and embodying the present invention.

Referring now in more detail and by reference characters to the drawings, which illustrate a preferred embodiment of the present invention, A designates a vacuum chamber constructed in accordance with our copending applications Serial No. 837,046, filed August 31, 1959, and Serial No. 846,618, filed October 15, 1959, including a relatively heavy cylindrical shell 1 mounted upon a base 2, and being provided with a head plate 3 and a rear plate 4, which are detachably joined to the shell 1 in such manner as to provide a vacuum-tight seal therewith.

Extending longitudinally in the shell 1 and supported by the head plate 3 and the rear plate 4 is a shaft 5 provided with a water-cooled drum 6 having an outer smooth surface 7 over which a web $w$ of the material to be coated will pass. The shaft 5 also extends longitudinally through the rear plate 4 and is provided at its outer end with a belt-drive pulley which is operatively connected by a conventional belt to an electric motor for causing the drum 6 to rotate. Also supported at each end by conventional bearings in the head plate 3 and the rear plate 4, and extending longitudinally therebetween, are a plurality of freely rotatable idler shafts 8, 9, 10, 11, 12, 13, 14, 15, 16, 17, 18, 19, and 20, which are located within the shell 1 in the manner disclosed by FIG. 2. Also extending between the head plate 3 and the rear plate 4, and located above the drum 6, are a plurality of identical shafts 21, 22, and 23, respectively, provided with spindles 24, 25, and 26, for operatively supporting rolls 27, 28, and 29, of sheet material. The shafts 21, 22, 23, may, if desired, be provided with axial adjustment means, braking means, and clutches, and are interconnected externally of the shell 1 with the drum 6 by common driving means, all of which elements are more fully described in our copending application Serial No. 846,618. Also operatively journaled in and extending between the head plate 3 and rear plate 4 are a pair of cutter shafts 30, 31, each provided with a plurality of rotatable cutters 32, 33, held in place by conventional keys $k$. The cutter shafts 30, 31, are located adjacent to idler shafts 13, 16, respectively, so that when the cutters 32, 33, are placed on the respective cutter shafts, the edges thereof will bear against and slit the web $w$ as it passes around the idler shafts 13, 16. Extending inwardly from the lower sides of the shell 1 in aligned relationship are a plurality of pairs of dielectric supports 34. Attached to the supports 34 and extending longitudinally within the shell 1 beneath the drum 6 is a dielectric catch pan 35 provided at its ends with a plurality of spaced dielectric brackets 36 which provide both support and rigidity to the catch pan 35, which has substantial width and includes a pair of parallel upwardly extending sides 37, 37', each of which are terminated with outwardly extending bends 38, 38'. The supports 34 also extend within the confines of the catch pan 35 through apertures in the sides 37, 37', for purposes presently more fully appearing.

Attached to the upwardly presented surface of the supports 34 and extending upwardly within the shell 1 are a plurality of brackets 39, to each of which is attached a shaft 40. Rotatably mounted about the shafts 40 are a plurality of rollers 41 for operatively supporting coils of metal wire $m$, the wire being of the particular metal which is to be applied as a film or coating to the web $w$. In the present embodiment, the preferred metal is aluminum for reasons which will presently be more fully pointed out. The supports 34 also include a rotating shaft 42 which is rigidly attached to a pinion 43 which, in turn, engages a worm gear 44 above which, in close proximity, is mounted a cooperating rotatable wheel 44'. Extending through clearance apertures in the sides 37, 37', of the dielectric catch pan 35 are a plurality of electrodes 45, 46, each including a hollow conducting tube 47, 48, which extends through the walls 37, 37', into the confines of the catch pan 35 and terminates respectively in a downward bend 49, 50. Mounted to the inner ends of opposing supports 39, 39', and extending therebetween, is a dielectric trough 51. It should be noted that the wire m is routed from the respective wire-feed reels 42, between the cooperating shafts 44 and 45, through the hollow tubes 47, 48, and into the trough 51. The trough 51 presents a low impedance path for a low voltage high-amperage electrical power source which is connected across electrodes 45, 46, whereby a high current may flow therebetween, generating a considerable amount of heat energy within the trough 51 due to the resistive component of the impedance in said path.

Rotatably mounted upon conventional bearings about either end of the shaft 5 is a forward mask supporting collar 60 and a rear mask supporting collar 61, collars 60 and 61 being in substantial alignment and each being provided with a pair of outwardly extending ears 62, 63, and 64, 65, respectively. Rear mask supporting collar 61 is also provided along its upper extremities with a plurality of spaced teeth 66 for engagement with a gear, as described in our copending application Serial No. 846,618, dated October 15, 1959. Extending between the ears 62 and 64, and bolted thereto by conventional bolt means, is a mask supporting tube 67; in like manner, a second mask supporting tube 68 is mounted to, and extends between ears 63 and 65. Mask supporting tube 67 is substantially cylindrical in shape over half of its outer periphery and includes on its other half a pair of flat orthogonal surfaces 69, 70, the side 69 being outwardly presented and substantially vertical in the normal operating position. The face 70 is provided along its entire mask with a plurality of uniformly spaced threaded holes 71 for purposes more presently appearing. Mask supporting tube 67 is provided internally with a pair of concentric channels 72, 73, which are separated by an internal wall 74 and are operatively connected to a pair of water supply tubes 75, 75', near the rear mask supporting collar 61, channels 71 and 72 being joined together substantially near the forward mask supporting collar 60 by an aperture in the wall 74, whereby to achieve a complete water flow path through the mask supporting tubes. In like manner, mask supporting tube 68 is provided with a pair of mutually orthogonal faces 76 and 77, a plurality of uniformly spaced threaded bores 78 in the face 77, a pair of concentric channels 79 and 80 separated by a wall 81, channels 79 and 80 being connected together by an aperture in the wall 81 substantially near the forward mask supporting collar 61 and to a pair of water supply tubes 82, 82', substantially near rear mask supporting collars 61 for purposes more fully appearing.

Bolted to mask supporting tubes 67 and 68, through apertures in ears 83 and 84 and extending therebetween, is a mask assembly 85 including a pair of parallel metallic members 86 and 87 which are attached at each of their ends to the ears 83 and 84, respectively, the members 86 and 87 being arcuate and slightly spaced from the lower arcuate portion of the drum 6. The members 86 and 87, in addition to being integrally attached to the ears 83 and 84, are also attached to each other substantially near the center to the mask assembly 85 by means of a plate 88 which is welded to each of said members and extends therebetween. Welded to the outer surfaces of ears 83 and 84 and to plate 88 is a continuous cooler tube 89 which includes an arcuate bend 90 in abutment with the ear 84; a second arcuate bend 91 which directs the tube 89 from the ear 84 around the drum 7 in substantial parallel relationship to the members 86 and 87; a third arcuate bend 92 which directs the tube 89 beneath the spacer plate 88 to which it is welded; a fourth arcuate bend 93 which redirects the tube 89 along a course parallel to the members 86 and 87 past the plate 88 and toward the ear 83; and a fifth arcuate bend 94 which routes the tube 82 onto the ear 83 to which it is also welded. The tube 89 provides a continuous path for a conventional liquid coolant and is provided at each of its ends with a conventional fitting 95 for purposes of obtaining the coolant from a coolant source. It should be noted that as the ears 83 and 84 are attached to mask supporting tubes 67 and 68, by conventional bolts, and that as the mask supporting tubes each contain a plurality of uniformly spaced threaded bores, a single mask assembly may be located in any number of convenient locations between the supporting tubes 67 and 68 or a plurality of mask asemblies as desired may be similarly located between the mask supporting tubes 67 and 68. If a plurality of mask assemblies is used, the cooling elements 89 may be connected in series or parallel by conventional methods.

Figure 2:
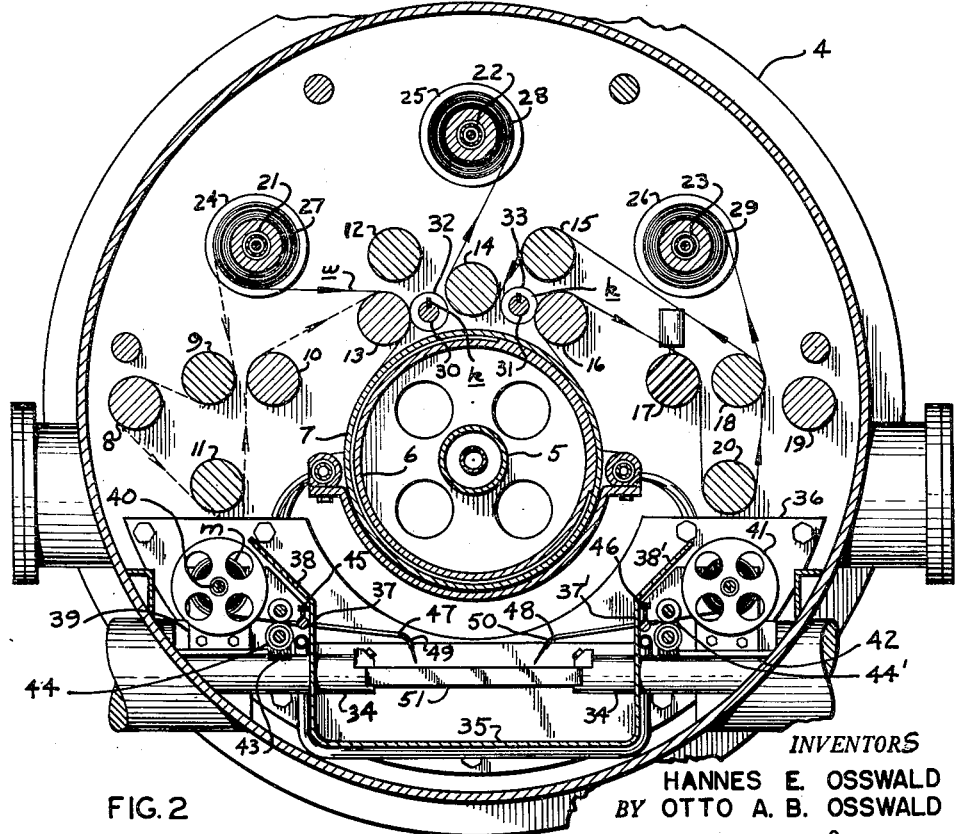
FIG. 2 is a fragmentary sectional view taken along lines 2—2 of FIG. 1.

In use, the shell 1 is evacuated to a very high distention and the web w is reeled from the spindle 27 around the several idler rollers and the drum 6 beneath the cutters 32, 33, and wound up on spindles 28, 29, along the path shown by the dotted lines of FIG. 2. Meanwhile, current is supplied to electrodes 45 and 46, whereby a large amount of heat is generated in the trough 51 and the metal wire m is melted. As the metal wire m melts, additional wire is fed into the trough 51 by means of the cooperating rollers 45 through the hollow tubes 47 and 48. At the high vacuum condition within the shell 1, the molten metal in the trough 51 vaporizes and the metal vapors rise upwardly into contact with the downwardly presented surface of the web w as it is passed over the drum 6. Since the drum 6 is cooled, this surface of the web w is also relatively cold and, consequently, the vaporized metal condenses thereon and forms a thin, but nevertheless dense, aluminum coating upon the web w. In the area covered by the cooled mask elements 85 and 86, no metal condenses on the web w. As a supply of cooling water is also routed through the mask supporting tubes 67 and 68, the ends of the mask assembly are also kept relatively cool and said tubes act as heat sinks, thereby preventing the entire assembly from being heated excessively by the metallic vapor. Thus, it is seen that the mask assembly and the mask supporting tubes with their cooling provisions uniquely coact to control the temperature on the surface on which the aluminum is deposited and to define certain lines where no aluminum will be deposited on the film.

By using the combination of the masks 85, as shown, and using a synthetic resin sheet-stock, such as cellophane or polythene in the web w, it is possible to produce a strip of film B, as depicted in FIG. 10, including a plurality of spaced surfaces 100, 101, 102, 103, 104, 105, 106, separated by non-metallic film surfaces 107, 108, 109, 110, 111, and 112, as depicted in FIG. 10. As has been above noted, aluminum, which has high electrical-conductivity, may be used, in which case the surfaces 100, 101, 102, 103, 104, 105, 106, are conductive and are dielectrically separated by the intermediate bare surfaces or strips 107, 108, 109, 110, 111, 112. With the cutters 32 and 33 cutting the film B along the cutting lines 113, a plurality of individual strips of film 120, substantially coated with aluminum including one uncoated margin 121, are produced and two of such strips may be attached to conductors 122, 122', in the manner shown in FIG. 11 to form the basic components of a capacitor C, the strips 120 being superimposed with their uncoated margins 121 oppositely spaced from one another. Suitable lengths of the strip 120 may then be wound to form a finished capacitor C, as depicted in FIG. 13, after which it may then be covered with a conventional casing of glass wax or the like. It should be noted that producing a capacitor with this type of film produces a highly desirable type of capacitor as the margins of the individual plates are not in substantial alignment being separated one from the other by the width of the margin 121, thereby increasing the length of the arc-over path between plates and effectively reducing the danger of shorting due to arc-over. Also as the amount of metal deposited on the film and the final film configuration is accurately controllable, the above-mentoined process readily adapted itself to the manufacturer of precision capacitors.

Referring now to FIGS. 6 and 7, a second practical embodiment of the mask of the present invention is presented. FIG. 6 shows a mask assembly 140 including a pair of spaced coplanar ears 141 and 142, each containing an elongated aperture 143 and 144, the ears 141 and 142 being connected by a pair of spaced parallel tapered rod-like members 145 and 146 which are formed in an arcuate bend which is slightly larger in radius than the radius of the drum 6, whereby when said mask assembly 140 is attached to the mask supporting tubes 67 and 68, the inner surface of the rod-like elements 145 and 146 will be slightly spaced from the film on the drum 6. It should be noted that the using of the mask assembly 140, the position of the individual masks with respect to the film is adjustable, due to the presence of the elongated apertures 143 and 144, whereby the bolts in the tubes 67 and 68 may be loosened and the mask assembly 140 may be moved longitudinally along mask supporting tubes 67 and 68. It should be noted that no cooling element is provided with the mask assembly 140, as it has been found that the rod-like members 145 and 146 are sufficiently large in cross-section to provide an adequate heat conductor for any heat absorbed by the condensing of the vaporized metal on the members 145 and 146. Should a coolant tube be required, a coolant tube similar to the coolant tube 89 could be readily attached.

Referring now to FIGS. 8 and 9, a third practical embodiment of the present mask is shown. Bolted to the bottom surface 70 of mask supporting tube 67 is an elongated bracket 160 provided with an internally presented tooth-like lateral margin 161 having a U-shaped cut-out 162 therein into which is inserted a resilient U-shaped channel 163. In like manner, an elongated bracket 164 is bolted to the bottom face 76 of mask supporting tubes 68 and also includes an inwardly presented tooth-like margin 165, a U-shaped cut-out 166 in said margin and a U-shaped resilient member 167 inserted in said U-shaped cut-out. The brackets 160 and 164 extend along the whole surface of the mask supporting tubes 67 and 68 as do the tooth-like margins 161 and 165 and the resilient members 163 and 167. The mask-like elements 168 contain an arcuate bend of radius slightly larger than the radius of the drum 6 and include at each end a plurality of teeth sized for engagement with the margins 161 and 165 of the brackets 160 and 164, respectively. After the brackets 160 and 164 have been bolted to mask supporting tubes 67 and 68, the masks 168 may be urged into engagement with the margins 161 and 165 held therein by the members 163 and 167. It should be noted that the masking elements 168 are sized sufficiently larger to provide heat escape path as the metal condenses on the mask elements 168. It should also be noted that using the mask elements 168 in combination with the brackets 160 and 164 and the resilient members 163 and 167 that any reasonable number of masking elements may be inserted therebeneath in various combinations of relative positions, spacing and alignment, due principally to the installation flexibility provided by the continuous rows of teeth 161 and 165. Preferably, though not necessarily, the mask elements 168 are sized somewhat larger than the spacing between the mask supporting tubes 67 and 68, so that when the mask elements 168 are inserted between said mask supporting tubes that a positive force holds the teeth of the mask-like element 168 in engagement with the tooth-like members 168 and 165.

It should be understood that changes and modifications in the form, construction, arrangement, and combination of the several parts of the present invention may be made and substituted for those herein shown and described without departing from the nature and principle of our invention.

Having thus described our invention, what we claim and desire to secure by Letters Patent is:

1. Vacuum-metalizing apparatus comprising an evacuated chamber, a dielectric catch pan, a dielectric trough mounted within said catch pan, means for supplying metal to said trough, vaporizing means consisting of a plurality of electrodes mounted within said catch pan and adapted to conduct an electric current for vaporizing said metal within said trough, a drum rotatably mounted within said chamber above said trough, hydraulic cooling means for cooling said drum, a first spindle means operatively mounted within said chamber for supporting a roll of sheet-stock, a second spindle means operatively mounted within said chamber for supporting a roll of sheet-stock, means for reeling the sheet-stock from one spindle means to the other and passing it over the drum during the course thereof, a pair of tubes mounted on opposite sides of said drum and extending longitudinally along said drum parallel to each other and to the axis of said drum, a masking element removably mounted upon said tubes and extending around the lower periphery of said drum in spaced relationship thereto, and means for cooling said tubes.

2. Vacuum-metalizing apparatus comprising an evacuated chamber, a dielectric catch pan, a dielectric trough mounted within said catch pan, means for supplying metal to said trough, vaporizing means consisting of a plurality of electrodes mounted within said catch pan and adapted to conduct an electric current for vaporizing said metal within said trough, a drum rotatably mounted within said chamber above said trough, hydraulic cooling means for cooling said drum, a first spindle means operatively mounted within said chamber for supporting a roll of sheet-stock, a second spindle means operatively mounted within said chamber for supporting a roll of sheetstock, means for reeling the sheet-stock from one spindle means to the other and passing it over the drum during the course thereof in order to form a metallized film on the sheet-stock, a pair of tubes mounted on opposite sides of said drum and extending longitudinally along said drum parallel to each other and to the axis of said drum, a plurality of masking elements removably mounted upon said tubes and extending around the lower periphery of said drum in spaced relationship thereto, said elements each lying in a plane which is perpendicular to the longitudinal axis of said drum and being spaced from said drum by a distance slightly greater than the thickness of said film, and means for cooling said tubes and said masking elements.

3. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, a mask unit removably secured to each of said tubes and comprising a pair of ears and a plurality of spaced mask elements rigidly attached at each of their ends to one of said ears, said mask unit being attached to said tubes through said ears, and a coolant-carrying tube opertively connected to a coolant supply and to said mask unit.

4. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, said tubes each including a flat face provided with a series of spaced threaded holes, a mask unit bolted to each of said tubes and comprising a pair of ears and a plurality of spaced mask elements rigidly attached at each of their ends to one of said ears, said mask elements also being connected intermediate their ends by a reinforcing plate, said mask unit being attached to said tubes through said ears, and a coolant-carrying tube operatively connected to a coolant supply, said mask unit, and said reinforcing plate.

5. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, said tubes each including a flat face provided with a series of spaced threaded holes, a mask unit bolted to each of said tubes and comprising a pair of ears and a plurality of spaced mask elements rigidly attached at each of their ends to one of said ears, said mask elements also being connected intermediate their ends by a reinforcing plate having an arcuate bend of substantial radius, said masking elements having a substantial radial dimension and a tapered cross-section, said taper being wider along the outermost radial position, said mask unit being attached to said tubes through said ears, and a coolant-carrying tube operatively connected to a coolant supply and to said mask unit.

6. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, said tubes each having an inwardly presented face which includes a plurality of teeth and a longitudinally extending slot, a plurality of masking elements each comprising an arcuate bend of slightly larger radial size than said drum and being provided at their ends with a plurality of teeth sized for engagement with the teeth of said tubes, and a resilient member disposed in said slot for holding the teeth of said masking element in abutment with the teeth of said tubes.

7. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, said tubes each having an inwardly presented face which includes a plurality of teeth and a longitudinally extending slot, a plurality of masking elements each comprising an arcuate bend of slightly larger radial size than said drum and being provided at their ends with a plurality of teeth sized for engagement with the teeth of said tubes, said elements having a substantial cross-section along an extension of a radial of said drum, said cross-section increasing in width as the radial distance increases whereby to define an outwardly widening taper, and a resilient member disposed in said slot for holding the teeth of said masking element in abutment with the teeth of said tubes.

8. Vacuum-metalizing apparatus comprising an evacuated chamber, a trough mounted within said chamber, means for supplying and vaporizing metal within said trough, a water-cooled drum rotatably mounted within said chamber, means for passing a continuous film over said drum, a mask assembly comprising a pair of spaced parallel tubes operatively mounted about said drum and each provided with a pair of channels which are operatively connected to a coolant supply and to each other, and a mask unit removably secured to each of said tubes and comprising a pair of ears and a plurality of spaced mask elements rigidly attached at each of their ends to one of said ears, said ears each being provided with an elongated slot-type aperture, said mask unit being slidably bolted to said tubes through said apertures whereby the longitudinal position of said unit with respect to said tubes may be adjusted, said masking elements all having a substantial cross-section along an extension of a radial of said drum.

9. Vacuum-metalizing apparatus comprising an evacuated chamber, a dielectric catch pan, a dielectric trough mounted within said catch pan, means for supplying metal to said trough, vaporizing means consisting of a plurality of electrodes mounted within said catch pan and adapted to conduct an electric current for vaporizing said metal within said trough, a drum rotatably mounted within said chamber above said trough, hydraulic cooling means for cooling said drum, a first spindle means operatively mounted within said chamber for supporting a roll of sheet-stock, a second spindle means operatively mounted within said chamber for supporting a roll of sheet-stock, means for reeling the sheet-stock from one spindle means to the other and passing it over the drum during the course thereof, masking means consisting of cylindrically-shaped supporting tubes connected to and fitted around the lower periphery of said drum, arcuate metallic masking elements operatively connected to said supporting tubes, and means for cooling said tubes and said masking elements.

References Cited in the file of this patent

UNITED STATES PATENTS

| | | |
|---|---|---|
| 2,073,313 | Murray | Mar. 9, 1937 |
| 2,211,583 | Ruben | Aug. 13, 1940 |
| 2,590,557 | Melsheimer | Mar. 25, 1952 |
| 2,639,490 | Brennan | May 26, 1953 |
| 2,665,228 | Stauffer | Jan. 5, 1954 |
| 2,702,760 | Barth | Feb. 22, 1955 |
| 2,891,880 | Nakken | June 23, 1959 |